US010528403B2

(12) United States Patent
Wu et al.

(10) Patent No.: US 10,528,403 B2
(45) Date of Patent: Jan. 7, 2020

(54) ADAPTIVE EVENT AGGREGATION

(71) Applicant: MuleSoft, Inc., San Francisco, CA (US)

(72) Inventors: Jiang Wu, Union City, CA (US);
Aditya Vailaya, San Jose, CA (US);
Leo Wong, San Francisco, CA (US);
Paulo Gustavo Veiga, Foster City, CA (US)

(73) Assignee: Mulesoft, Inc., San Francisco, CA (US)

( * ) Notice: Subject to any disclaimer, the term of this patent is extended or adjusted under 35 U.S.C. 154(b) by 0 days.

(21) Appl. No.: 15/874,714

(22) Filed: Jan. 18, 2018

(65) Prior Publication Data

US 2019/0129767 A1 May 2, 2019

Related U.S. Application Data

(60) Provisional application No. 62/579,045, filed on Oct. 30, 2017.

(51) Int. Cl.
*G06F 9/54* (2006.01)
*G06N 20/00* (2019.01)

(52) U.S. Cl.
CPC .............. *G06F 9/542* (2013.01); *G06F 9/547* (2013.01); *G06N 20/00* (2019.01)

(58) Field of Classification Search
CPC ...................................................... G06F 9/542
USPC ........................................................ 719/318
See application file for complete search history.

(56) References Cited

U.S. PATENT DOCUMENTS

| 7,562,391 | B1* | 7/2009 | Nachenberg | G06F 21/52 726/22 |
| 7,603,458 | B1* | 10/2009 | Sexton | H04L 41/065 709/224 |
| 7,644,438 | B1* | 1/2010 | Dash | H04L 63/0218 703/17 |
| 8,941,657 | B2* | 1/2015 | Agarwal | G06F 16/26 345/440 |
| 10,037,232 | B1* | 7/2018 | Garcia | G06F 9/544 |
| 2005/0138642 | A1 | 6/2005 | Breh et al. | |
| 2005/0262237 | A1 | 11/2005 | Fulton et al. | |
| 2008/0082661 | A1 | 4/2008 | Huber et al. | |
| 2016/0380916 | A1 | 12/2016 | Gnaneswaran et al. | |
| 2017/0223136 | A1 | 8/2017 | Ghosh et al. | |
| 2018/0176185 | A1* | 6/2018 | Kumar | H04L 63/0263 |

OTHER PUBLICATIONS

Song, Y. et al., "Towards a Framework to Support Novice Users in Understanding and Monitoring of Home Area Networks," IEEE International Conference on Pervasive Computing and Communications Workshops (Mar. 2012), pp. 82-87.

\* cited by examiner

*Primary Examiner* — Andy Ho
(74) *Attorney, Agent, or Firm* — Sterne, Kessler, Goldstein & Fox P.L.L.C.

(57) ABSTRACT

An application network is monitored using a plurality of agents. Adaptive event aggregation is performed to determine retaining values for an aggregation dimension. A report of the application network is generated based on the aggregation dimension.

20 Claims, 7 Drawing Sheets

… (1)

ADAPTIVE EVENT AGGREGATION

CROSS REFERENCE TO OTHER APPLICATIONS

This application claims priority to U.S. Provisional Patent Application No. 62/579,045 entitled ADAPTIVE EVENT AGGREGATION filed Oct. 30, 2017 which is incorporated herein by reference for all purposes.

BACKGROUND OF THE INVENTION

Application networks include at least one server computer coupled with a plurality of client computers, often communicating via at least one API (Application Programming Interface). The popularity of application networks may result in tens of thousands of API calls representing client to server calls. The number of API calls may be overwhelming for the purpose of monitoring, troubleshooting, and/or analytics.

BRIEF DESCRIPTION OF THE DRAWINGS

Various embodiments of the invention are disclosed in the following detailed description and the accompanying drawings.

DETAILED DESCRIPTION

Figure 1:
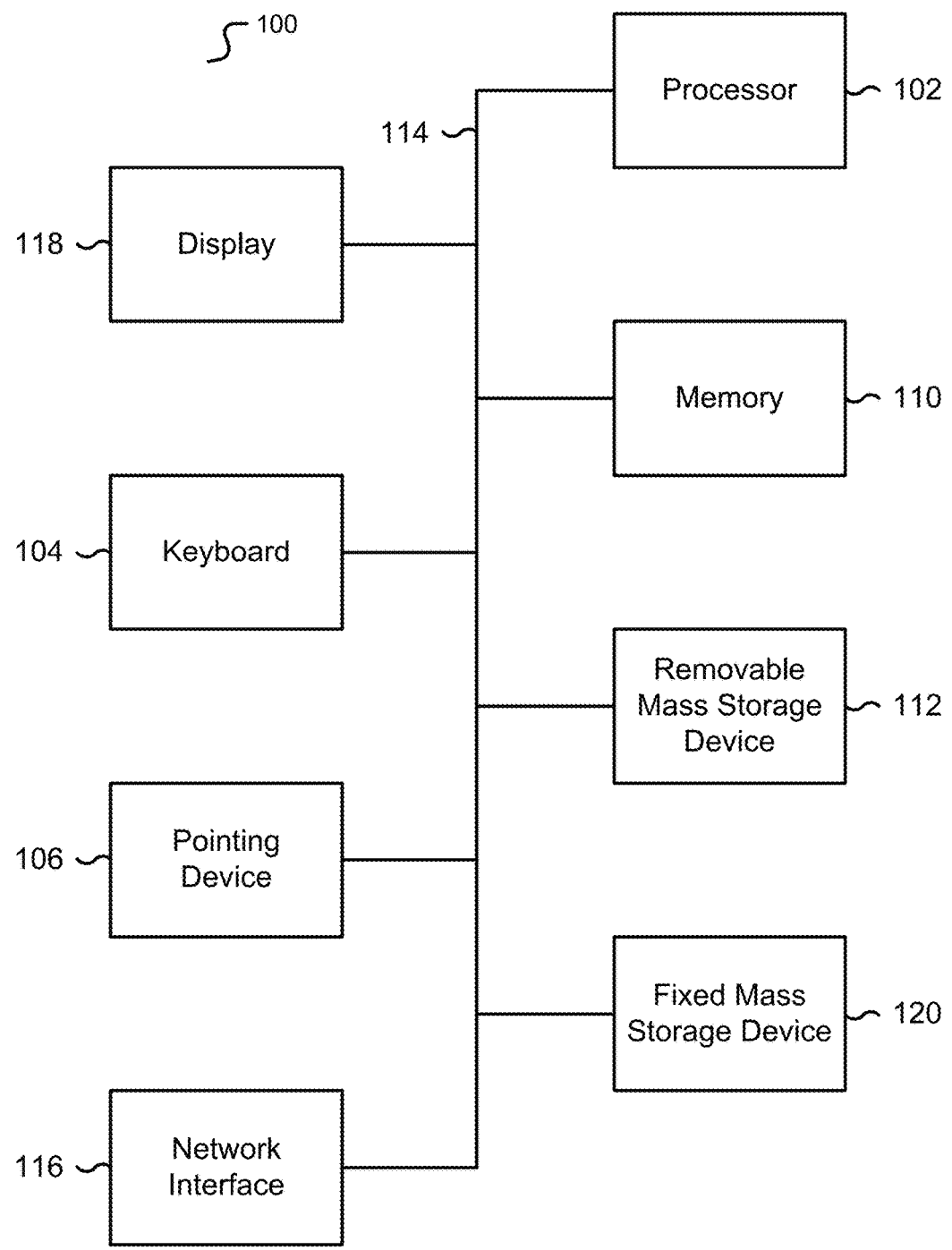
FIG. 1 is a functional diagram illustrating a programmed computer/server system for adaptive event aggregation in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Adaptive event aggregation is disclosed. In one embodiment, lightweight agents monitor network/API communications that need only use small memory/processor resources on host to capture relevant metrics. It is not required to have a priori knowledge before data flows, for example, whether metrics to be captured are between server and server with relatively few API calls or metrics to be captured are between server and client with a massive number of API calls. In either case, relevant metrics are captured with complete lossless event reporting without requiring statistical sampling. Inline, real-time learning for different computing environments determines which dimensions are relevant for such lossless reporting, and alternately which dimensions may be lossy and/or aggregated/collapsed in the event of a massive number of API calls.

By contrast, traditionally without a priori knowledge of whether there are a massive number of API calls, sampling is used for event monitoring, troubleshooting, and/or analytics. Another traditional approach is to capture all API calls for offline and/or post processing which at massive scale may be expensive in terms of compute/memory/time/network/financial resources.

A runtime application network visualizer is disclosed. The visualizer displays inter-application API communication between software application instances. In a runtime application network visualization, each application instance may be represented as a graph node. Graph edges may be generated by deriving unique combinations of source and destination information from captured API call events from one application instance to another application instance. The number of API call events may range from single digit to tens of thousands per application instance per minute. Using a large number of API call events per application instance to derive edges may consume a lot of computing resources.

A system to aggregate the API call events to reduce the amount of computing resources used in edge generation is disclosed. The system adaptively learns and preserves important information. In one embodiment, lightweight agents monitor network/API communications and/or monitor events. These lightweight agents are resourceful with respect to memory, processor, and/or network capacity. These agents capture relevant metrics with lossless event reporting, as opposed to traditional statistical sampling. These agents perform inline, real-time learning for different computing environments to determine which dimensions are relevant for such lossless reporting, and which dimensions may be lossy and/or aggregated/collapsed.

FIG. 1 is a functional diagram illustrating a programmed computer/server system for adaptive event aggregation in accordance with some embodiments. As shown, FIG. 1 provides a functional diagram of a general purpose computer system programmed to provide adaptive event aggregation in accordance with some embodiments. As will be apparent, other computer system architectures and configurations can be used for adaptive event aggregation.

Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display and graphics processing unit (GPU) 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data, and objects used by the processor 102 to perform its functions, for example, programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 can also include computer-readable media such as flash memory, portable mass storage devices, holographic storage devices, magnetic devices, magneto-optical devices, optical devices, and other storage devices. A fixed mass storage 120 can also, for example, provide additional data storage capacity. One example of mass storage 120 is an eMMC or microSD device. In one embodiment, mass storage 120 is a solid-state drive connected by a bus 114. Mass storages 112, 120 generally store additional programming instructions, data, and the like that typically are not in active use by the processor 102. It will be appreciated that the information retained within mass storages 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a communication interface 116, a touch (or physical) keyboard 104, and one or more auxiliary input/output devices 106 including an audio interface, a sound card, microphone, audio port, audio recording device, audio card, speakers, a touch (or pointing) device, and/or other subsystems as needed. Besides a touch screen and/or capacitive touch interface, the auxiliary device 106 can be a mouse, stylus, track ball, or tablet, and is useful for interacting with a graphical user interface.

The communication interface 116 allows processor 102 to be coupled to another computer, computer network, or telecommunications network using a network connection as shown. For example, through the communication interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification, "network" refers to any interconnection between computer components including the Internet, Bluetooth, WiFi, 3G, 4G, 4GLTE, GSM, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through communication interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example, a script that can be executed using an interpreter.

The computer/server system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2A:
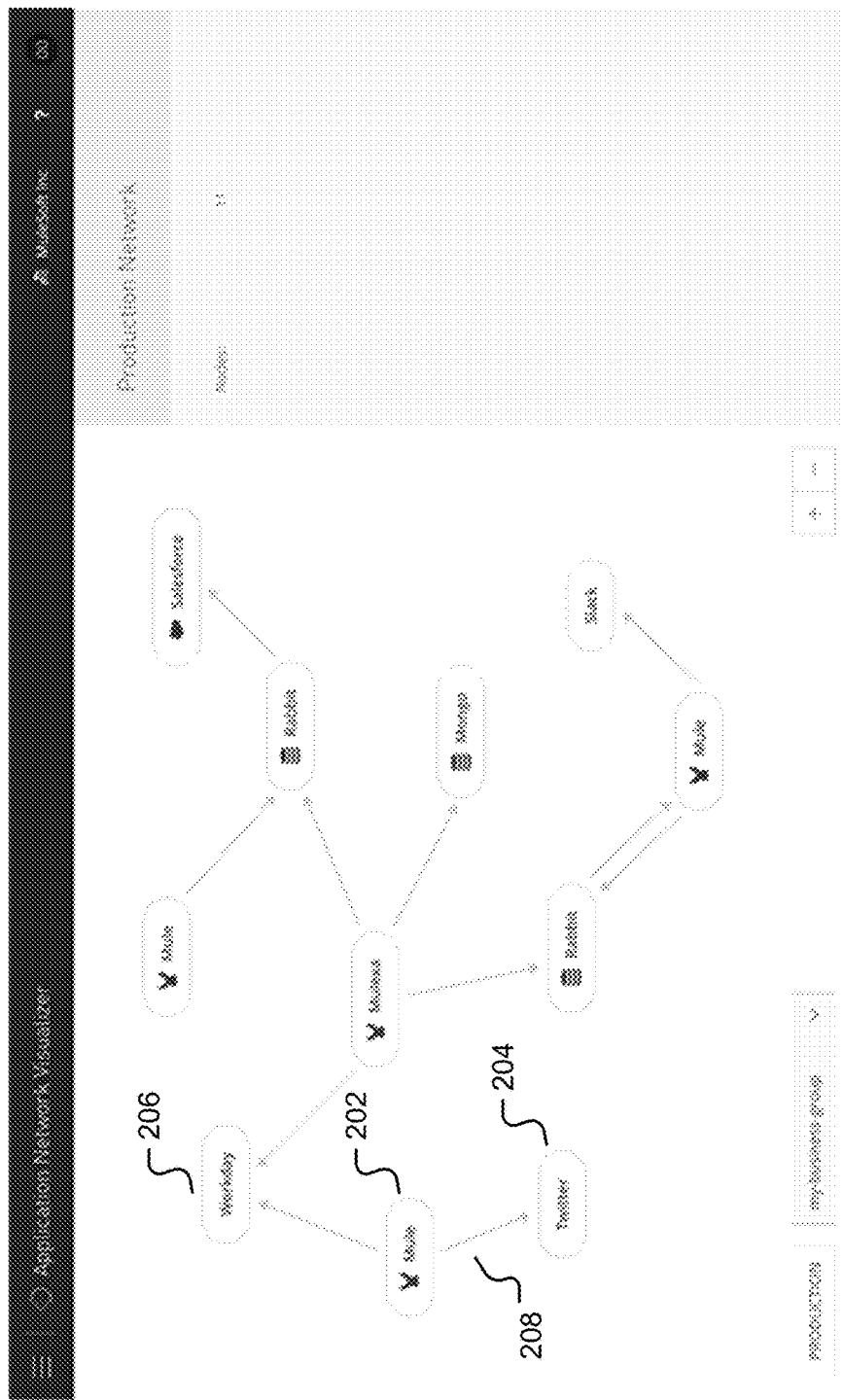
FIG. 2A is an illustration of an application network visualization.

FIG. 2A is an illustration of an application network visualization. A runtime application network as described herein is a set of software application instances that communicate with each other through their APIs over a computer network. An application instance may be any executing software program such as an embedded software instance in an IOT (internet of things) sensor, a software service, a database server, a desktop client browser, or a mobile app.

In one embodiment, the communications are visualized between the application instances via their APIs for purposes of monitoring, troubleshooting, and analytics, as shown in FIG. 2A. This visualization may take the form of a directed graph. To visualize a runtime application network, each application instance may be represented as a graph node, such as the 11 nodes shown in FIG. 2A labeled "Mule" (202), "Twitter" (204), "Workday" (206), and so forth. Nodes may be named the same in FIG. 2A to indicate instances of the same application.

Graph edges may be derived by analyzing API call events between application instances. The direction of the edge may indicate the API call direction from an application instance calling into another application instance, for example, the graph edge (208) directed from "Mule" to "Twitter" in FIG. 2A. The number of API events observed per node may be highly variable. It is possible that tens of thousands of API events produce just a few edges when it is server to server. On the other hand, tens of thousands of API calls may produce thousands of edges in the case of client to server calls.

Figure 2B:
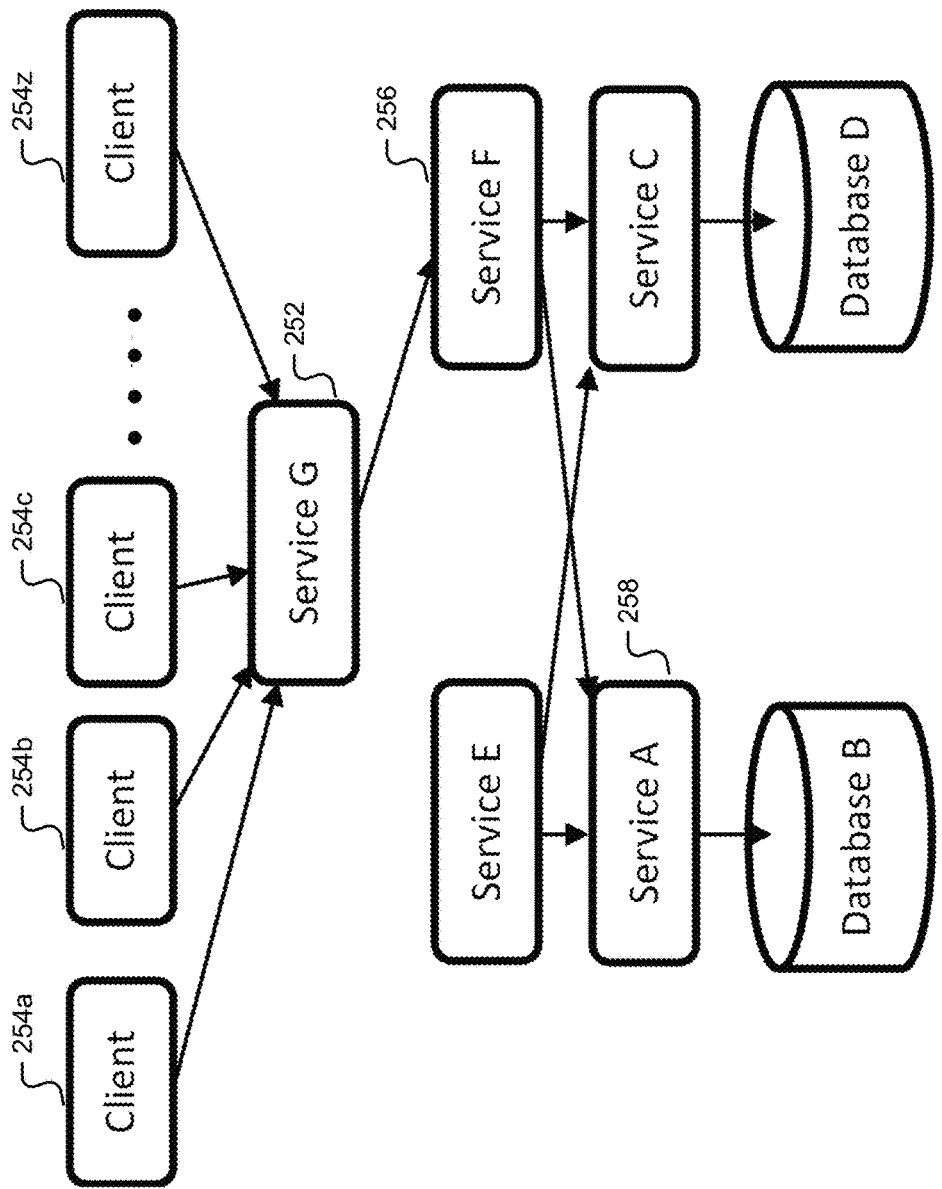
FIG. 2B illustrates a sample shape of an application network.

FIG. 2B illustrates a sample shape of an application network. As shown in FIG. 2B, "Service G" (252) may see tens of thousands of clients making API calls to a server (254a . . . 254z). At the same time and in the same topography there may be a small number of servers that communicate very often, for example between "Service F" (256) and "Service A" (258), in which case every pair of servers' API calls may be tracked carefully.

It may be computationally expensive to track a massive number of API call events, such as between (252) and (254a . . . 254z). Techniques to inline aggregate API call events to reduce and limit the amount of data used to generate graph edges is disclosed.

Figure 3:
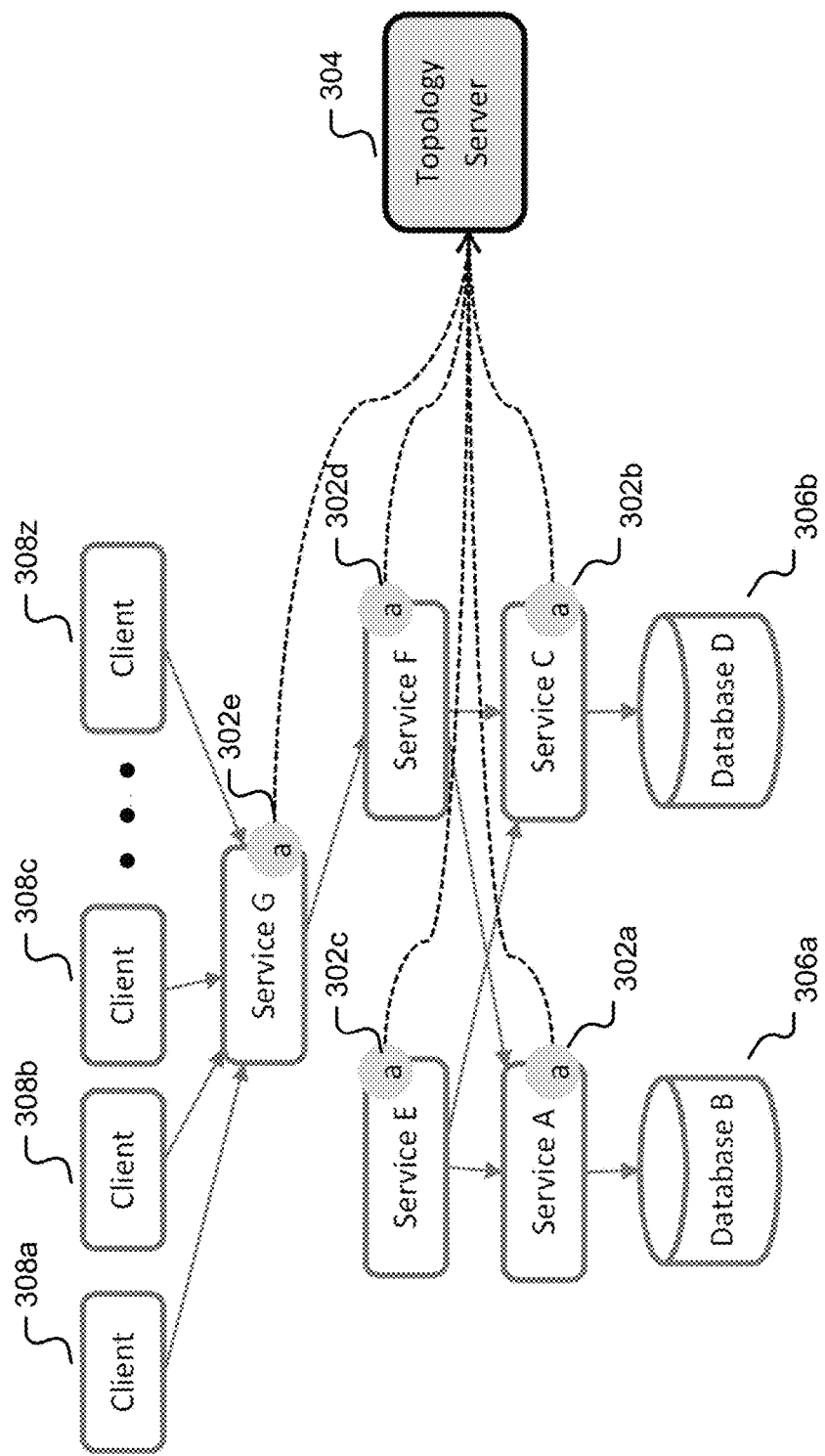
FIG. 3 illustrates agents and a topology server.

FIG. 3 illustrates agents and a topology server. A runtime application network may be made of application instances. In one embodiment, a lightweight network visualizer agent is installed and run inside each application instance, shown as a circled "a" in FIG. 3 (302a . . . 302e), for example an agent (302b) in "Service C." The agent may collect incoming API calls to the application instance as well as outgoing API calls from the application instance. In general, agents may run only on a subset of the application instances as not all application instances may allow agents to be installed.

Agents may run independently from each other. One agent may not know a priori if there are other agents running elsewhere in the application network. In order to generate a complete picture of the entire application network, the communication information gathered by each agent may be sent to a network topology server (304). The topology server combines the information from each instance to form a global view of the runtime application network.

In one embodiment, agents may gather information for various service nodes in the network such as agents (302a . . . 302e), but not on the database nodes (306a, 306b) or the client browser nodes (308a . . . 308z). The gathered information is transmitted to a topology server (304).

In a runtime environment, the agent (302a . . . 302e) may continuously transmit data to the topology server (304) because the observed API call information changes over time. For example, if an agent transmits the collected communication information to the topology server (304) every minute, then in the first minute, there may be five different clients (308a . . . 308z) making one API call each to "Server G." In the next minute, there may be just one client (308a) making many API calls to "Server G." As a result, the API call event data transmitted by an agent to the topology server (304) is highly variable in number as well as in the event content uniqueness.

Deriving edges using time series events is disclosed. An edge in a runtime application network graph represents an API interaction from one application instance to another application instance. An edge may contain information about the application instance that initiated the API calls, the application instance that receives the API calls, as well as response information for the API call such as start time, call duration, response code, response size, and so on. An edge may represent a single API call or multiple API calls of the same characteristics such as the same source, destination, method, response code, and so on.

A sample capture of API call data is given in this table:

|  | source | | destination | | Response | | |
| --- | --- | --- | --- | --- | --- | --- | --- |
| Start Time | ip | port | . . . IP | Port | . . . code | Duration | Size . . . |
| 2018-03-02 12:32:42.003 | 10.0.23.123 | 8374 | . . . 10.2.34.212 | 80 | . . . 200-OK | 34 | 2314 . . . |

On Mar. 2, 2018 at 12:32:42.003 a call goes from IP address:port 10.0.23.123:8374 to IP address:port 10.2.34.212:80 with a response, in this case an HTTP response, of code 200 (OK) of size 2314 bytes with a duration of 34 ms. As the API call in the runtime happens only for a time interval, as represented above using the "Start Time" and the "Duration," each API call may be represented as a time series event. As a time series event, the various information contained in an API call may be grouped into at least one of: timestamp, contextual dimensions, and event data.

An API call may be represented as a time series event, as given in this table:

| Timestamp | Contextual Dimensions | | | | Event Data | | |
|---|---|---|---|---|---|---|---|
| | source | | destination | | Response | | |
| Start Time | ip | port | IP | Port | ... code | Duration | Size ... |
| 2018-03-02 12:32:42.003 | 10.0.23.123 | 8374 | 10.2.34.212 | 80 | ... 200-OK | 34 | 2314 ... |

In this time series event table:

Timestamp—is the API call start timestamp;

Contextual Data—a set of label-value pairs, describing the source and destination information about the API calls. These data points are non-additive; and Event Data—a set of label-value pairs. There are two types of event data, additive metric data and non-additive data.

Additive metric data is a label-value wherein the value is a numerical measure with the characteristics that this numerical measure may be combined from many events to form sums. These sums may then be used to derive statistical measures such as averages. Non-additive data is a label-value wherein the value may be a categorical, ordinal, free-form text, or numbers that it does not add value or sense to sum across events.

The content of a time series event comprises:

Event timestamp: An event timestamp;

Dimension: One or more dimensional values for non-additive contextual data and non-additive event data; and Metric (optional): Zero or more additive metric values for event data.

Using the above structure, API calls may be represented using a structured object:

```
{
    "timestamp":"2018-03-02 12:32:42.003",        // event timestamp
    "source":{
        "ip":"10.0.23.123",                       // dimension
        "port":"8374",                            // dimension
        "application-name":"assessment server",   // dimension
        "server-id":"abc-123"                     // dimension
    },
    "destination": {                              // dimension
        "ip":"10.2.34.212",
        "dns-name":"kpi-data-service.cloudhub.io", // dimension
        "port":"443",                             // dimension
        "protocol":"https",                       // dimension
    },
    "client-id":"071BF1A3-7CA3-48F0-CE67220EB70D", // dimension
    "response-code":"200",                        // dimension
    "response-duration":"34",                     // metric
    "response-size":"2314",                       // metric
    ...
}
```

Aggregating time series events is disclosed. There is an improvement over traditional techniques in aggregating time series events to reduce the amount of storage and processing required. In order to aggregate time series events, which events are "similar" must be determined. Event similarity is defined herein as events with the same dimensional values for all or a subset of dimensions in the events. Using the above example, the user may state that two events are similar when their "source.ip" are the same. Or two events may be similar when their "source.ip," "destination.ip," and "client-id" are the same. Or two events may be similar when all the dimensions have the same values.

After event similarity is defined by the user, an aggregation time window may also be specified to collapse the similar events within a window of time into a single aggregated event. For example, the aggregation time window may be 1 minute, 5 minutes, 1 hour, 1 day, and so on.

When multiple events are collapsed into a single aggregated event, the metrics from the various events are combined to form aggregated metrics. Any metric can be selected for aggregation, for example, response size or duration could be combined over multiple events. As a result, an aggregated event comprises:

Aggregation Time Interval: time start and duration of the aggregated event;

Aggregation Dimensions: all or a subset of event dimensional values for non-additive contextual data and non-additive event data; and Aggregated Metrics: combined and aggregated metric values from individual event data.

As defined aggregation dimensions may be a subset of the event dimensions, the event dimensions that are not part of the aggregation dimensions are called collapsed dimensions. An example of a collapsed dimension is a response code. The aggregated events do not contain any information about the collapsed dimensions.

The result of time series event aggregation produces one aggregated event for each unique combination of time interval and aggregation dimension values. The number of aggregated events may be less than the number of original events.

Using aggregated events for graph edges is disclosed. In a runtime application network, a time series event may represent a single API call between two applications. These API calls may be used to derive the graph edges representing interactions between the applications in the network. Each edge may represent a unique combination of source and destination for the API call. Repeated calls from the same source to the same destination generate the same edge in the graph.

An example set of API call events between application instances is given in this table:

| Event Timestamp | Source IP | Src Port | Destination IP | Dest Port | Response Code | Response Duration | Response Size |
|---|---|---|---|---|---|---|---|
| 2018-03-02 12:32:42.003 | 10.0.23.123 | 8374 | 10.2.34.212 | 80 | 200-OK | 34 | 2314 |
| 2018-03-02 12:33:13.243 | 10.0.23.123 | 8374 | 10.2.34.212 | 80 | 200-OK | 45 | 1734 |

-continued

| Event Timestamp | Source IP | Src Port | Destination IP | Dest Port | Response Code | Response Duration | Response Size |
|---|---|---|---|---|---|---|---|
| 2018-03-02 12:33:38.624 | 10.0.23.123 | 8374 | 10.2.34.212 | 80 | 200-OK | 39 | 2314 |
| 2018-03-02 12:33:38.523 | 10.0.4.211 | 2342 | 10.2.34.212 | 80 | 200-OK | 49 | 1934 |
| 2018-03-02 12:33:51.028 | 10.0.23.123 | 8374 | 10.2.34.212 | 80 | 400-Bad Request | 21 | 42 |

Using the above five events, an application network with three distinct application instances located at 10.0.23.123, 10.0.4.211, and 10.2.34.212 may be derived. Node 10.0.23.123 is in communication with 10.2.34.212. Node 10.0.4.211 is communicating with 10.2.34.212, but node 10.0.23.123 is not communicating with 10.0.4.211.

Instead of using raw events to derive the edges, aggregated events may be used to generate graph edges. Five events may be aggregated first using a one-minute time window with aggregation dimensions of Source IP and Destination IP. The aggregation process would then produce the following:

| Aggregated Event Timestamp | Source IP | Destination IP | Event Count | Response Duration Average | Response Size Average |
|---|---|---|---|---|---|
| 2018-03-02 12:32:00.000 | 10.0.23.123 | 10.2.34.212 | 1 | 34 | 2314 |
| 2018-03-02 12:33:00.000 | 10.0.23.123 | 10.2.34.212 | 3 | 44.3 | 1994 |
| 2018-03-02 12:33:00.000 | 10.0.4.211 | 10.2.34.212 | 1 | 49 | 1934 |

As shown above, the five events are reduced to three aggregated events. From the three aggregated events, the same application network visualization may be derived. This example illustrates that there may be a reduction in memory and computation used to derive an application network, if the system first aggregates the raw events into aggregated events. This may be especially effective for server-to-server communication, for example between "Service A" and "Service F" in FIG. 3.

High cardinality dimensions are described herein. During time series event aggregation, an aggregation dimension may contain many unique values. The number of unique values per dimension is the cardinality of the dimension. When a dimension has high cardinality, then that dimension may have a high number of unique values. As a result, an aggregation dimension's cardinality determines the degrees of data reduction during aggregation.

For example, if raw events are represented by the following table:

| Event Timestamp | Source IP | Src Port | Destination IP | Dest Port | Response Code | Response Duration | Response Size |
|---|---|---|---|---|---|---|---|
| 2018-03-02 12:32:42.003 | 10.0.23.123 | 8374 | 10.2.34.212 | 80 | 200-OK | 34 | 2314 |
| 2018-03-02 12:33:13.243 | 10.0.23.21 | 8374 | 10.2.34.212 | 80 | 200-OK | 45 | 1734 |
| 2018-03-02 12:33:38.624 | 10.0.17.100 | 8374 | 10.2.34.212 | 80 | 200-OK | 39 | 2314 |
| 2018-03-02 12:33:38.523 | 10.0.4.211 | 2342 | 10.2.34.212 | 80 | 200-OK | 49 | 1934 |
| 2018-03-02 12:33:51.028 | 10.0.4.123 | 8374 | 10.2.34.212 | 80 | 400-Bad Request | 21 | 42 |

With source IP and destination IP-based aggregation, the aggregated results are represented by the following table:

| Aggregated Event Timestamp | Source IP | Destination IP | Event Count | Response Duration Average | Response Size Average |
|---|---|---|---|---|---|
| 2018-03-02 12:32:00.000 | 10.0.23.123 | 10.2.34.212 | 1 | 34 | 2314 |
| 2018-03-02 12:33:00.000 | 10.0.23.21 | 10.2.34.212 | 1 | 45 | 1734 |

-continued

| Aggregated Event Timestamp | Source IP | Destination IP | Event Count | Response Duration Average | Response Size Average |
|---|---|---|---|---|---|
| 2018-03-02 12:33:00.000 | 10.0.17.100 | 10.2.34.212 | 1 | 39 | 2314 |
| 2018-03-02 12:33:00.000 | 10.0.4.211 | 10.2.34.212 | 1 | 49 | 1934 |
| 2018-03-02 12:33:00.000 | 10.0.4.123 | 10.2.34.212 | 1 | 21 | 42 |

The above example is an example of high cardinality within the Source IP dimension, which represents nearly a worst case scenario where no reduction takes place for aggregation. This may occur for client-to-server communications, which are also instances where massive API calls may overwhelm traditional monitoring, troubleshooting, and/or analytics.

Handling high cardinality dimensions is disclosed. The high cardinality dimensions in a runtime application network may happen for several event dimensions of the API events such as "source IP," "API URI," "client ID," and so on.

For example, an application network may contain an application server ("Service G" in FIG. 3 associated with 302e) taking requests from desktop or mobile clients (308a . . . 308z). From the application server's perspective, there are a large number of distinct client IP addresses. This may imply many edges in a client-to-server application, perhaps on the order of 10,000 edges.

However, if the application server ("Service F" associated with 302d) is designed for use by other application servers ("Service A" associated with 302a, "Service C" associated with 302b, and "Service G" associated with 302e), then the application server may see just a handful of distinct server IP addresses. This may imply few edges in a server-to-server application, perhaps on the order of ten edges.

The result is that for the same set of dimensions, such as source IP, the dimensions may be high cardinality for client-to-server type applications, or low cardinality for server-to-server type applications.

One challenge in building a runtime application network through runtime API call events is that there may be no a priori and/or upfront information regarding the type of application server usage: serving clients or serving other servers. Alternately, an application server usage may change over time. As a result, it may be difficult to use traditional techniques for automatically handling high cardinality dimensions during event aggregation, such as the following common strategies for dealing with a potential high cardinality dimension:

A novel technique superior to these traditional approaches is disclosed. This technique is referred herein as "adaptive event aggregation" and:

1. Provides low resource utilization: it does not retain all raw events in order to produce aggregation;
2. Automatically selects values from high cardinality dimensions to retain without a priori knowledge; and
3. Generates accurate metrics for the values retained.

Figure 4:
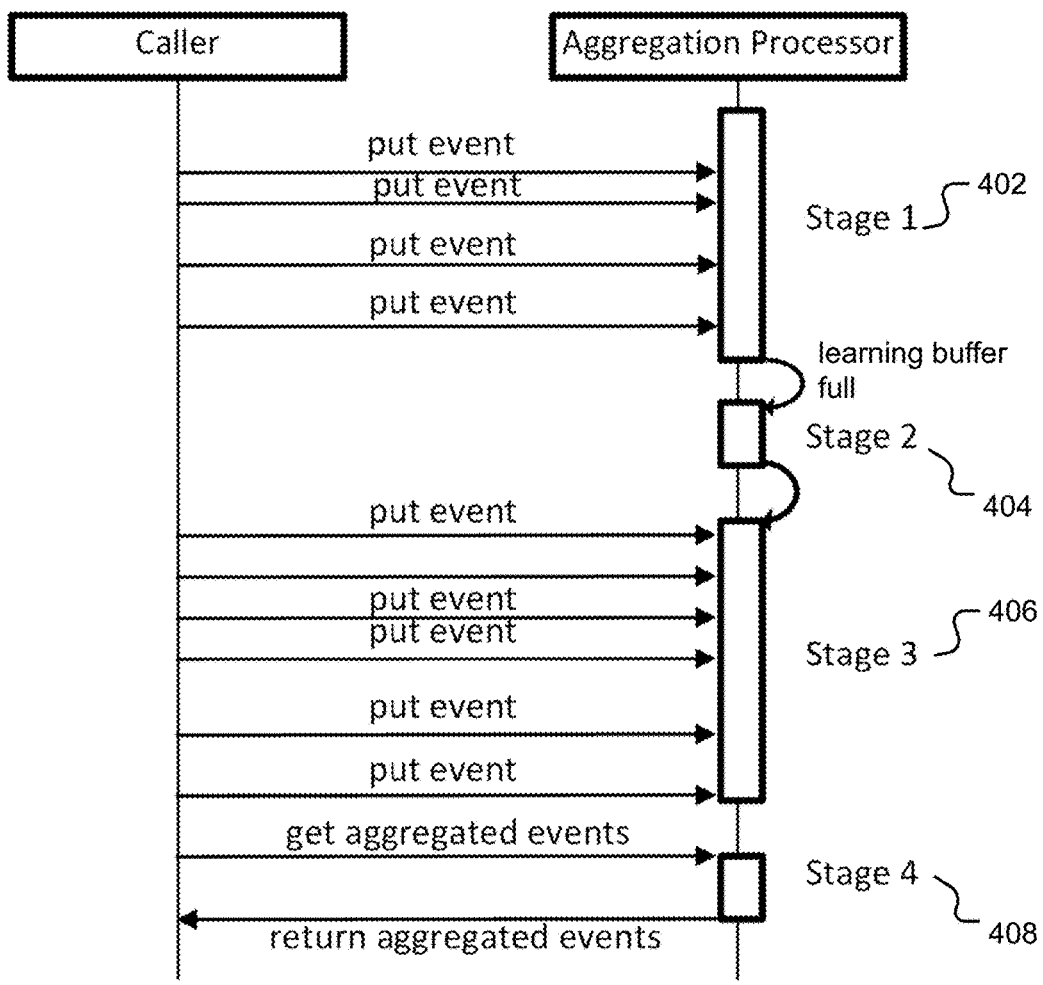
FIG. 4 is an illustration of a sequence diagram for adaptive event aggregation.

FIG. 4 is an illustration of a sequence diagram for adaptive event aggregation. In one embodiment, adaptive event aggregation sends raw API call events to an aggregation system. After a specified amount of time, the caller may trigger the aggregation system to return all the aggregated events at that point. The aggregation system utilizes a set of aggregation processors. As described herein, an "aggregation processor" is a software and/or software-hardware element dedicated to processing data, which may for example be object/binary code. In one embodiment, an aggregation processor is a part of each lightweight agent (302a . . . 302e). Each aggregation processor works by going through the following internal stages.

1. Stage 1: sample data collection;
2. Stage 2: learning;
3. Stage 3: inline aggregation; and
4. Stage 4: extracting aggregated results, reset to stage 1.

Configuration may occur at each aggregation processor (302a . . . 302e) and/or within the topology server (304). The following configurable parameters are given to the adaptive aggregation system:

1. Lossless, lossy, and collapsed aggregation dimensions;
2. Aggregated and unused metrics;
3. Learning buffer size, learning algorithm, retaining value count; and
4. Output size.

In one embodiment, the configurable parameters control the behavior of the aggregation. Each event dimension may be configured as one of the following types:

1. Lossless aggregation dimensions—a full or subset of the event dimensions, whose unique dimensional values are preserved during the aggregation;

| Strategy | Pros | Cons |
| --- | --- | --- |
| Do not use this dimension<br><br>Use for aggregation dimension without special handling | May not impact degrees of aggregation. | Not always possible to skip. For example, client IP, which potentially may be high cardinality, has to be used for building application network. Aggregation may produce no benefit. Poorer case scenarios lead to very large memory and CPU resource utilization. |
| Random sampling - sampled values are kept; all other values are grouped together as a single "other" value | Produces good aggregation. Low resource required. | Aggregation produces estimation per sampled value, which may not be accurate enough metrics. |
| Specify set of values to keep - all other values are grouped together as a single "other" value | Produces good aggregation. Accurate metrics for selected values. Low resource required. | Requires a priori knowledge on which value to keep. This is not always possible, too cumbersome, or prone to operator error. |
| Simple top-N: group by all possible values and produce top occurring values and place all other values into a single "other" value | Produces good aggregation. Accurate metrics for top-N values. | High resource utilization to produce aggregation. All events may need to be stored first before any (post-processed) aggregation may be produced in a worser case where all events are unique. |

2. Lossy aggregation dimensions—a full or subset of the event dimensions, whose unique dimensional values are partially preserved during the aggregation. The system may preserve as much information as possible on these dimension values using limited/bounded amounts of memory and computational resources; or 3. Collapsed dimensions—a full or subset of the event dimensions whose dimensional values are not preserved during the aggregation.

An event metric may be specified as one of the following types:

1. Aggregated metrics—event metrics that are aggregated and outputted; or

2. Unused metrics—event metrics that are ignored during the aggregation and may not appear in the output.

Additionally, the user of the system may specify:

1. Learning buffer size—the number of unique keys in the learning buffer, as described further in Stage 1 below;
2. Learning algorithm—a plug-in/pluggable algorithm to use to perform (adaptive) learning;
3. Output size—a size guide to specify the maximum number of outputs to produce for the aggregation regardless of the number of input events; and/or
4. Retaining value count—the number of important values to keep for each of the lossy aggregation dimensions.

An example of sample code on configuring the data aggregation system includes:

```
// Import the data-limiter packages
import com.mulesoft.analytics.limiter.DefaultEventProcessorBuilder;
import com.mulesoft.analytics.limiter.EventLimiterResult;
import com.mulesoft.analytics.limiter.EventProcessor;
import com.mulesoft.analytics.limiter.EventProcessorResult;
import com.mulesoft.analytics.limiter.StrategyType;
import com.mulesoft.analytics.limiter.UserEvent;
import com.mulesoft.analytics.limiter.data.StringNamePath;
public class AdaptiveAggregationProcessor {
    EventProcessor processor;    // module to perform adaptive aggregation
    DefaultEventProcessorBuilder builder; // configuration for above module
    public AdaptiveAggregationProcessor( ) {
        builder = new DefaultEventProcessorBuilder ( ) ;
        builder.setRetainingValueCount(10);            // max number of unique values to
retain per lossy dimension
        builder.setMaxOutput(100);                     // aggregation output size
        builder.setLearningSize(1000);                 // learning buffer size
builder.setStrategy(StrategyType.ADAPTIVE_TOP_N); // choose Adaptive learning
algorithm
// Other strategies are:
//    SAMPLING - use random sampling
//    TOP_N - classic top N by storing all data, then produce top N
        // Specify the lossy dimensions
        builder.addLossyDimension(new StringNamePath("client_ip"));
        builder.addLossyDimension(new StringNamePath("path"));
        // Specify lossless dimensions
        builder.addDimension(new StringNamePath("org_id"));
        builder.addDimension(new StringNamePath("api_id"));
        builder.addDimension(new StringNamePath("api_platform_metadata_policy_name"));
        builder.addDimension(new StringNamePath("api_platform_metadata_sla_tier_id"));
        builder.addDimension(new
StringNamePath("api_platform_metadata_application_id"))
        builder.addDimension(new StringNamePath("client_id"));
        builder.addDimension(new StringNamePath("policy_violation_outcome"));
        builder.addDimension(new StringNamePath("policy_violation_policy_id"));
        builder.addDimension(new StringNamePath("request_disposition")).
        builder.addDimension(new StringNamePath("status_code"));
        builder.addDimension(new StringNamePath("verb")).
        builder.addDimension(new StringNamePath("api_version_id"));
        // Specify metrics to aggregate
        builder.addLongMetric(new StringNamePath("response_bytes"));
        builder.addDoubleMetric(new StringNamePath("response_time"));
        processor = builder.build( );
    }
    // call this method to insert new events into the system.
    public String ingestData(Collection<Event> events) {
processor.append(events);
    }
    // call this method to retrieve aggregated and limited output
    public List<EventLimiterResult> outputData( ) {
        EventProcessorResult epr = processor.retrieveProcessorResult( );
        List<EventLimiterResult> elr = epr.getLimiterResults( );
        return epr.getLimiterResults( );
    }
}
```

Lossless Dimensions.

When a user configures one or more lossless dimensions, multiple independent adaptive aggregation processors (302a . . . 302e) may be used. If the user specifies no lossless dimension, then a single adaptive aggregation processor may be used. Given an event, the system first may create a lookup key using the values from the lossless dimensions. This lookup key may be used to locate an existing aggregation processor in a processor map. If such a processor is not found, then a new aggregation processor may be created/ instantiated and added to the processor map for the lookup key. The event may then be sent to the aggregation processor. All events within an aggregation processor have the same values for their lossless dimensions. Each aggregation processor independently performs the 4-stage adaptive aggregation on the lossy dimensions.

For example, a sequence of API events is represented in this table:

| Event Timestamp | Source IP | Destination IP | Response Code | Response Duration | Response Size |
|---|---|---|---|---|---|
| 2018-03-02 12:32:42.003 | 10.0.23.123 | 10.2.34.212 | 200-OK | 34 | 2314 |
| 2018-03-02 12:33:13.243 | 10.0.23.123 | 10.2.34.212 | 400-Bad Request | 22 | 42 |
| 2018-03-02 12:33:38.624 | 10.0.23.123 | 10.2.34.212 | 200-OK | 39 | 2314 |
| 2018-03-02 12:33:38.523 | 10.0.4.211 | 10.2.34.13 | 200-OK | 49 | 1934 |
| 2018-03-02 12:33:51.028 | 10.0.23.123 | 10.2.34.212 | 400-Bad Request | 21 | 42 |

If lossless dimensions are "Destination IP" and "Response Code," three independent aggregation processors are created/instantiated, each processing events with the same lossless dimensional values, as represented by each of these three tables:

Aggregation Processor 1

| Lookup Key | Event Timestamp | Source IP | Destination IP | Response Code | Rsp Dur | Rsp Size |
|---|---|---|---|---|---|---|
| Destination IP = 10.2.34.212, Response Code = 200-OK | 2018-03-02 12:32:42.003 | 10.0.23.123 | 10.2.34.212 | 200-OK | 34 | 2314 |
| | 2018-03-02 12:33:38.624 | 10.0.23.123 | 10.2.34.212 | 200-OK | 39 | 2314 |

Aggregation Processor 2

| Lookup Key | Event Timestamp | Source IP | Destination IP | Response Code | Rsp Dur | Rsp Size |
|---|---|---|---|---|---|---|
| Destination IP = 10.2.34.212, Response Code = 400-Bad Request | 2018-03-02 12:33:13.243 | 10.0.23.123 | 10.2.34.212 | 400-Bad Request | 22 | 42 |
| | 2018-03-02 12:33:51.028 | 10.0.23.123 | 10.2.34.212 | 400-Bad Request | 21 | 42 |

Aggregation Processor 3

| Lookup Key | Event Timestamp | Source IP | Destination IP | Response Code | Rsp Dur | Rsp Size |
|---|---|---|---|---|---|---|
| Destination IP = 10.2.34.13, Response Code = 200-OK | 2018-03-02 12:33:38.523 | 10.0.4.211 | 10.2.34.13 | 200-OK | 49 | 1934 |

Stage 1—Sample Data Collection.

Each aggregation processor goes through up to four internal stages as depicted in FIG. 4. During Stage 1 (402), each event that is received is stored into a key-value structure in memory. This key-value structure is referred to herein as the "learning buffer." Each key is a unique combination of aggregation dimensional values, the associated value is an aggregated event holding the sets of aggregated metrics for the events with the same key. For the example in the Aggregation Processor 1 table above, the lookup key is "Destination IP=10.2.34.212, Response Code=200-OK." The size of the learning buffer may not exceed the learning buffer size as configured by the user.

In one embodiment, a pre-processing stage is used prior to receiving each event, before Stage 1. For example, one pre-processing stage may be to take an IP address and reduce it to a subdomain, for example 24.1.23.237 is reduced to 24.1.23.0, and 24.1.23.123 is also reduced to 24.1.23.0.

When a new event arrives, if the key from the unique combination of the dimensional values already exists in the key-value structure, then the value is updated to include the new event's metric values. If the key doesn't exist, the system then checks to see if the current size of the key-value is less than the learning buffer size. If it is, then a new entry is added to the key-value for the new event.

If the current size of the key-value structure is at the learning buffer size such that the learning buffer is full, then a new event is not inserted into the key-value structure. Instead, Stage 2 is triggered and the new event may be processed in Stage 3, as described in detail below.

For example, a learning buffer collects events where "Source IP" and "Destination IP" are lossy dimensions for an aggregator process with Response Code as the lossless dimension. Since all events processed by this processor may have the same lossless dimensional value, it is the source IP and Destination IP values that may vary. But during Stage 1, the learning stage, all unique combinations of source IP and Destination IP are maintained despite being lossy, prior to the learning buffer being full. The timestamp of each aggregated event in the learning buffer shows the time of arrival of every first event with that unique combination of source and destination IPs. The learning buffer in this example is represented by this table:

Learning Buffer Example

| First Event Timestamp | Source IP (lossy dimension) | Destination IP (lossy dimension) | Response Code (lossless dimension) | Event Count | Response Duration Average | Response Size Average |
|---|---|---|---|---|---|---|
| 2018-03-02 12:32:00.000 | 10.0.23.123 | 10.2.34.212 | 200-OK | 2 | 34 | 2314 |
| 2018-03-02 12:33:00.000 | 10.0.6.56 | 10.2.34.212 | 200-OK | 1 | 44.3 | 1994 |
| 2018-03-02 12:33:12.000 | 10.0.23.123 | 10.2.34.210 | 200-OK | 1 | 21 | 4211 |
| 2018-03-02 12:33:36.000 | 10.0.23.122 | 10.2.34.212 | 200-OK | 2 | 36.3 | 2033 |

Stage 2—Learning.

As described above, Stage 2 (404) is triggered when the learning buffer is at the learning buffer size limit, and a new event arrives that does not fit inside the existing set of unique keys. Stage 2 performs an analysis of the aggregated event in the learning buffer using a specified learning algorithm. A number of algorithms may be supplied ranging from the traditional sampling to the adaptive algorithm. In this section, an adaptive algorithm is described in more detail.

In adaptive learning, the system attempts to identify for each lossy dimension, the most important dimension values. Once those dimension values are identified, the metrics surrounding those values are tracked. To identify the most important dimension values, the learning step iterates through all the aggregated events in the learning buffer generating a frequency count for each unique value of the lossy dimensions. If there is more than one lossy dimension defined, then the dimensional value count is generated for all the lossy dimensions.

Using the Learning Buffer Example table from Stage 1, with lossy dimensions of Source IP and Destination IP, the following value counts generate the following histograms:
Source IP Histogram:

| Source IP | Event Count |
|---|---|
| 10.0.23.123 | 3 |
| 10.0.23.122 | 2 |
| 10.0.6.56 | 1 |

Destination IP Histogram:

| Destination IP | Event Count |
|---|---|
| 10.2.34.212 | 5 |
| 10.2.34.210 | 1 |

As shown above, the value count for each lossy aggregation dimension is a frequency histogram for that dimension. Using this histogram, the system picks values to keep. The values picked are referred to herein as "retaining values." The system uses multiple factors to determine the retaining values from the total number of unique values, the event count frequency, the deviation of the frequency, and shape of the histogram.

For example, if total number of unique values is less than the retaining value count, then all values may be added as retaining values. If the histogram shows high deviation between high frequency values vs other values, only high frequency values are retained. If the histogram shows many low frequency values, perhaps none of the values are retained. The result of the analysis may be zero or more retaining values picked. However, the number of retaining values may not exceed the retaining value count configuration property specified by the user.

After the learning analysis, the processor moves into Stage 3.

Stage 3—Inline Aggregation.

After the learning stage and at the start of Stage 3 (406), the aggregation processor now has the following data points:
1. A learning buffer that is at capacity; and
2. For each lossy aggregation dimension, a set of zero or more retaining values.

The processor creates a secondary buffer referred to herein as an "overflow buffer." The overflow buffer is similar in structure to the learning buffer. The overflow buffer is used to store additional aggregated events with their aggregated metrics.

At this point, the processor resumes processing of incoming events. The first event to process in Stage 3 is the event that triggered Stage 2. For each event processed in Stage 3, the following is applied:
1. Create a key using the value combination from the lossy dimensions of the event;
2. Check if key is in the learning buffer. If it is found, then the metrics are aggregated into the existing learning buffer;
3. If the key is not found in the learning buffer, for each lossy dimension, check if the value of that lossy dimension is one of the retaining values. If the value is one of the retaining values, the value stays as is. If the value is not one of the retaining values, then the value in the event is updated to a special token "<OTHER>."
4. Create an overflow key using the updated values from step 3 above from the lossy dimensions.
5. Use the overflow key to find a corresponding aggregated event in the overflow buffer. If an entry is found in the aggregated buffer, then the event's metric is aggregated into the found entry. If an entry is not found, then a new aggregated event entry is created for the overflow key and the event metric is added into the new aggregated event.

In Stage 3 (406), the size of the overflow buffer has a known upper-bound. The maximum number of entries inside the overflow buffer is the product $$\prod_i (m_i + 1)$$

wherein $m_i$ is the dimension of each retained value. For example, using the Learning Buffer example shown above for Stage 1 (402) and Stage 2 (404), if the processor chooses to retain the following values for the source IP and destination IP dimensions:

| Source IP | Event Count | Retain |
|---|---|---|
| 10.0.23.123 | 3 | Yes |
| 10.0.23.122 | 2 | Yes |
| 10.0.6.56 | 1 | No | and

| Destination IP | Event Count | Retain |
|---|---|---|
| 10.2.34.212 | 5 | Yes |
| 10.2.34.210 | 1 | No | then the maximum number of entries in the overflow buffer is 3×2=6.

Continuing with this example, suppose the following additional events are received at Stage 3 (406):

| Event Timestamp | Source IP | Destination IP | Response Code | Response Duration | Response Size |
|---|---|---|---|---|---|
| 2018-03-02 12:33:38.103 | 10.0.23.123 | 10.2.34.212 | 200-OK | 30 | 2133 |
| 2018-03-02 12:33:38.624 | 10.0.23.123 | 10.2.34.211 | 200-OK | 39 | 2314 |
| 2018-03-02 12:33:42.024 | 10.0.6.51 | 10.2.34.212 | 200-OK | 23 | 3111 |
| 2018-03-02 12:33:38.523 | 10.0.6.51 | 10.2.34.13 | 200-OK | 49 | 1934 |

Then:
1. For the first event, (source=10.0.23.123, destination=10.2.34.212) is found in the learning buffer, and so the learning buffer metrics are updated;
2. For the second event, (source=10.0.23.123, destination=10.2.34.211) is added to the overflow buffer with (source=10.0.23.123, destination=<OTHER>) as the overflow key because the original source IP and destination IP combination does not exist in the learning buffer, and the source IP value is a retaining value, but the destination IP is not;
3. For the third event, (source=10.0.6.51, destination=10.2.34.212) is added to the overflow buffer with (source=<OTHER>, destination=10.2.34.212) as the overflow key because the original source IP and destination IP combination does not exist in the learning buffer, and the source IP value is not a retaining value, but the destination IP is a retaining value; and
4. For the fourth event, (source=10.0.6.51, destination=10.2.34.13) is added to the overflow buffer with (source=<OTHER>, destination=<OTHER>) overflow key because neither source IP nor the destination IP are a retaining value.

The resulting learning buffer is updated to:

| First Event Timestamp | Source IP (lossy dimension) | Destination IP (lossy dimension) | Response Code (lossless dimension) | Event Count | Response Duration Average | Response Size Average |
|---|---|---|---|---|---|---|
| 2018-03-02 12:32:00.000 | 10.0.23.123 | 10.2.34.212 | 200-OK | 3 | 32.7 | 2253.7 |
| 2018-03-02 12:33:00.000 | 10.0.6.56 | 10.2.34.212 | 200-OK | 1 | 44.3 | 1994 |
| 2018-03-02 12:33:12.000 | 10.0.23.123 | 10.2.34.210 | 200-OK | 1 | 21 | 4211 |
| 2018-03-02 12:33:36.000 | 10.0.23.122 | 10.2.34.212 | 200-OK | 2 | 36.3 | 2033 | and the resulting overflow buffer is updated to:

| First Event Timestamp | Source IP (lossy dimension) | Destination IP (lossy dimension) | Response Code (lossless dimension) | Event Count | Response Duration Average | Response Size Average |
|---|---|---|---|---|---|---|
| 2018-03-02 12:33:38.624 | 10.0.23.123 | <OTHER> | 200-OK | 1 | 39 | 2314 |
| 2018-03-02 12:33:42.024 | <OTHER> | 10.2.34.212 | 200-OK | 1 | 23 | 3111 |
| 2018-03-02 12:33:38.523 | <OTHER> | <OTHER> | 200-OK | 1 | 49 | 1934 |

As both the learning buffer and the overflow buffer are bounded and/or have maximum sizes, Stage 3 processing conserves a finite amount of memory regardless of how many additional events are processed. In one embodiment, each event that is processed through Stage 3 is processed in a timeframe that is an order of a constant O(1), as the event is only checked against the two buffers to determine how to aggregate that event.

Given a retaining value, there are entries containing that value in the learning buffer and potentially the overflow buffer. Combining the metrics from all entries with the same retaining value gives an accurate metrics for that retaining value.

Stage 4—Extracting Aggregated Result.

The caller may then extract the aggregate result from the aggregation processor (408). When extraction is invoked, the aggregation processor may be in either Stage 1 (402) or Stage 3 (406).

If the processor is still in Stage 1 (402), the system checks to see if the learning buffer contains more entries than the configured output size. If the learning buffer does not contain more entries than the configured output size, then the entire content of the learning buffer is returned. If the learning buffer contains more entries than the configured output size, then a Stage 2 learning is forced to generate retaining values and an aggregate result is extracted as per described below when the aggregation processor is in Stage 3 (406).

If the aggregation processor is in Stage 3 (406) when extraction is invoked, the processor first sorts the learning buffer by descending event count. Then the processor picks the top N entries up to the configured output size. If there are any entries remaining in the learning buffer, each of the remaining entries is processed into the overflow buffer by examining the lossy dimension values against the retaining values to generate overflow keys. Using the overflow keys, all remaining aggregated events in the learning buffer are placed into the overflow buffer. After this processing, the content of the overflow buffer is appended to the output.

Continuing the above example, if the output size is 2, then the following is the output from the aggregation processor:

Learning Buffer:

| First Event Timestamp | Source IP (lossy dimension) | Destination IP (lossy dimension) | Response Code (lossless dimension) | Event Count | Resp Dur Avg | Resp Size Avg | Output? |
|---|---|---|---|---|---|---|---|
| 2018-03-02 12:32:00.000 | 10.0.23.123 | 10.2.34.212 | 200-OK | 3 | 32.7 | 2253.7 | Yes |
| 2018-03-02 12:33:00.000 | 10.0.6.56 | 10.2.34.212 | 200-OK | 1 | 44.3 | 1994 | Add to overflow |
| 2018-03-02 12:33:12.000 | 10.0.23.123 | 10.2.34.210 | 200-OK | 1 | 21 | 4211 | Add to overflow |
| 2018-03-02 12:33:36.000 | 10.0.23.122 | 10.2.34.212 | 200-OK | 2 | 36.3 | 2033 | Yes |

Overflow Buffer:

| First Event Timestamp | Source IP (lossy dimension) | Destination IP (lossy dimension) | Response Code (lossless dimension) | Event Count | Resp Dur Avg | Resp Size Avg |
|---|---|---|---|---|---|---|
| 2018-03-02 12:33:38.624 | 10.0.23.123 | <OTHER> | 200-OK | 2 | 30 | 3262.5 |
| 2018-03-02 12:33:42.024 | <OTHER> | 10.2.34.212 | 200-OK | 2 | 33.7 | 2552.5 |
| 2018-03-02 12:33:38.523 | <OTHER> | <OTHER> | 200-OK | 1 | 49 | 1934 |

Combined Output:

| First Event Timestamp | Source IP (lossy dimension) | Destination IP (lossy dimension) | Response Code (lossless dimension) | Event Count | Resp Dur Avg | Resp Size Avg |
|---|---|---|---|---|---|---|
| 2018-03-02 12:32:00.000 | 10.0.23.123 | 10.2.34.212 | 200-OK | 3 | 32.7 | 2253.7 |
| 2018-03-02 12:33:36.000 | 10.0.23.122 | 10.2.34.212 | 200-OK | 2 | 36.3 | 2033 |
| 2018-03-02 12:33:38.624 | 10.0.23.123 | <OTHER> | 200-OK | 2 | 30 | 3262.5 |
| 2018-03-02 12:33:42.024 | <OTHER> | 10.2.34.212 | 200-OK | 2 | 33.7 | 2552.5 |
| 2018-03-02 12:33:38.523 | <OTHER> | <OTHER> | 200-OK | 1 | 49 | 1934 |

Note that the output contains accurate metrics for each of the chosen retaining dimension values. For source IP 10.0.23.123, the output shows a total of five events. For source IP 10.0.23.122, the output shows a total of two events. For destination IP of 10.2.34.212, the output produces a total of seven events.

When the processor is in Stage 3 (406), the sum of the output size and the overflow buffer size is the size of the output. In one embodiment, after result extraction, the processor clears its learning buffer and overflow buffer and resets back to Stage 1 (402).

In configuring an aggregation processor, there are several advantages of the aggregation processor runtime characteristics over traditional techniques:

1. Finite memory usage—Each aggregation processor uses a fixed sized learning buffer plus an overflow buffer that has a known upper bound;
2. Streaming aggregation—As events are processed by the processor, aggregations are produced on the fly without holding on to the incoming event;
3. Constant compute time—Each event is processed using a constant amount of computation through two constant time lookups against the learning and overflow buffer; and
4. Accurate metrics for retained values—The output contains accurate metrics for all retained values for lossy dimensions.

Plug-in/Pluggable Stage 2 Learning.

As described in FIG. 4, adaptive aggregation/processing is broken down into stages. As a result, different learning algorithms may be switched out in Stage 2 (404) using a plug-in for identifying which lossy dimension values to retain. This opens multiple possibilities for learning:

1. Combining Learning Buffers. As described in FIG. 4 Stage 2 (404), the learning algorithm may use frequency within a single learning buffer to decide the retaining values. As there may be multiple learning buffers, one per unique combination of lossless dimension values, the algorithm may also utilize the frequency from all learning buffers to determine which values to retain over space. Using all learning buffers together gives a global perspective to pick the lossy dimension values to retain;
2. Utilize Historical Retained Values. Another variation on learning for Stage 2 (404) is utilizing previous retaining values over time instead of using the values from the current learning buffer. By combining the retaining values from previous detection with the current values, a more stable set of retaining values is provided. Historical retaining values may be associated with a decay such that if the retaining value is not observed further, then slowly, it is removed from consideration over time; and/or
3. Using Different Metrics. Instead of using frequency, this alternate type of learning algorithm may use different metrics such as response time or response size to determine retaining values. This produces different semantics to the output. Instead of producing accurate metrics for most frequently occurring events, using response time or response size may produce accurate metrics for events with high or low response time and response size. Identifying dimension values for this type of events may be important for certain use cases.

Additional Use Cases.

As disclosed herein and without limitation, using adaptive aggregation for application network visualization edge generation is merely one use case. The adaptive aggregation method is a generalized technique that works for any stream of events with dimensions and metrics. As a result, the adaptive aggregation method is implemented as a generic library that may be embedded into many host applications and services.

For example, adaptive aggregation is used in analytics agents that aggregate and limit the metric events collected before sending the aggregated data to a central analytics service. This reduces the network resources consumed by the metrics as well as protects the analytics systems from being overwhelmed by unlimited amounts of data.

When it is not possible to update the agent to include adaptive aggregation, the same aggregation library may also be used at the service side. When the service receives data from agents, it may first pass the data through the aggregation library to reduce and limit the amount of data before passing the aggregated events to the rest of the service.

Figure 5:
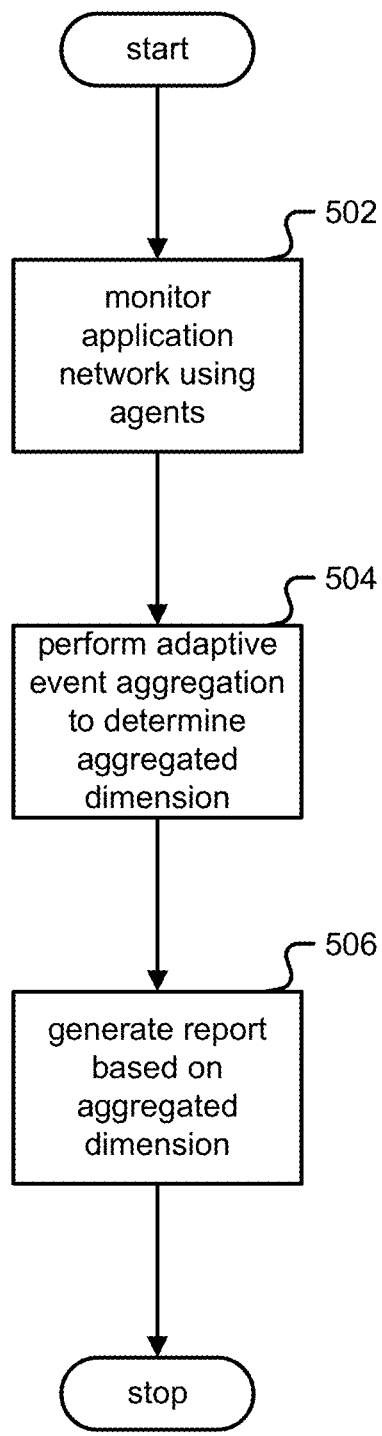
FIG. 5 is a flow chart illustrating an embodiment of a process for adaptive event aggregation.

FIG. 5 is a flow chart illustrating an embodiment of a process for adaptive event aggregation. In one embodiment, the process of FIG. 5 is carried out by the system in FIG. 3.

In step 502, an application network is monitored using a plurality of agents. In one embodiment, the plurality of agents comprises a plurality of lightweight agents.

In step 504, adaptive event aggregation is performed to determine values for an aggregation dimension. In one embodiment, performing adaptive event aggregation comprises determining the values of an aggregation dimension based at least in part on aggregating over events associated with monitoring the application network using the plurality of agents. In one embodiment, performing adaptive event aggregation comprises performing inline learning and collection of event data. In one embodiment, adaptive event aggregation is performed by an aggregation processor.

In step 506, a report of the application network is generated based on the aggregation dimensions. In one embodiment, the report comprises at least one of the following: a visualization of the application network, an event monitoring report, and a network topology report.

In one embodiment, agent aggregated metrics are communicated under reduced network bandwidth. In one embodiment, a graphical visualization of the application network is generated based on the report indicating critical and failure events based on a success threshold.

In one embodiment, a graphical visualization of a topology of the application network is generated. The graphical visualization may comprise graphical cues for at least one of the following: name-value pairs of monitored data, contextual dimensions, event data, time stamp, network tuple of IP address, network tuple of port, network tuple of protocol, response code, count of dimension, number of calls between entities of the application network, size of dimension, and response size.

Figure 6:
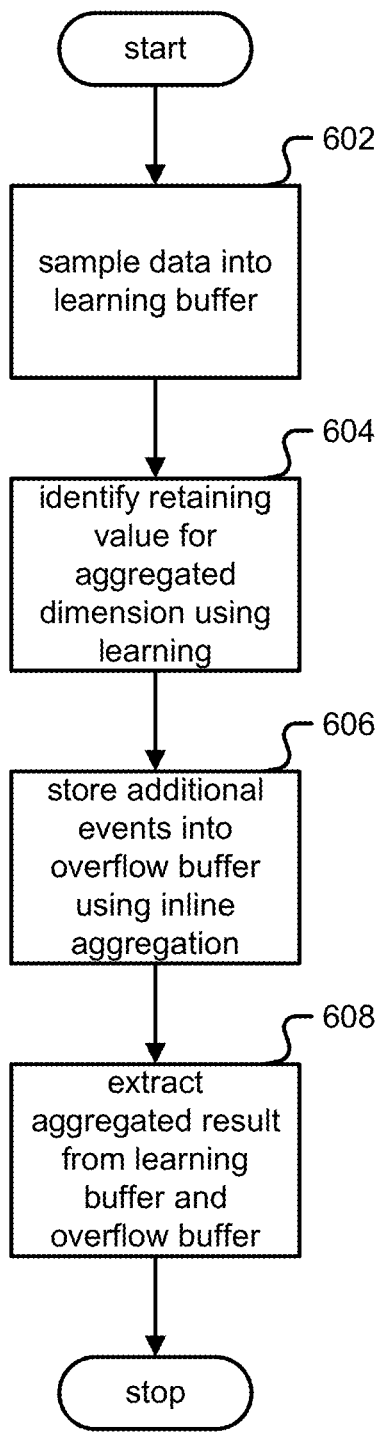
FIG. 6 is a flow chart illustrating an embodiment of a process for aggregation processing.

FIG. 6 is a flow chart illustrating an embodiment of a process for aggregation processing. In one embodiment, the process of FIG. 6 is carried out by the agents (302a ... 302e) in FIG. 3 and is part of step (504) in FIG. 5.

In step 602, a data collection is sampled into a learning buffer. In one embodiment, at least one of the following are configurable: learning buffer size, learning algorithm, output size, and retaining value count.

In step 604, in an event that the learning buffer is full, a retaining value for the aggregation dimension is identified using learning. In one embodiment, adaptive learning is used to identify the retaining value. In one embodiment, the aggregation dimension is configurable as at least one of the following: a lossless dimension, a lossy dimension, and a collapsed dimension. In one embodiment, identifying the retaining value comprises configuring a metric as at least one of the following: aggregated and unused.

In one embodiment, identifying using learning comprises using at least one of the following: a top N technique, an adaptation over time technique, a combining learning buffer technique, a historical retained values technique, and a different metric technique.

In step 606, additional events are stored into an overflow buffer using inline aggregation. In one embodiment, storing additional events comprises linear computation of additional events including lossless metrics for retained values.

In step 608, an aggregated result is extracted from the learning buffer and the overflow buffer.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  at least one processor; and
  a memory coupled with the at least one processor, wherein the memory is configured to provide the processor with instructions which when executed cause the at least one processor to:
    monitor an application network using a plurality of agents;
    sample a data collection into a learning buffer;
    perform adaptive event aggregation to determine retaining values for an aggregation dimension using learning in an event that the learning buffer is full;
    store additional events into an overflow buffer using inline aggregation;
    extract an aggregated result from the learning buffer and the overflow buffer; and
    generate a report of the application network based on the aggregation dimension.

2. The system recited in claim 1, wherein performing adaptive event aggregation comprises determining the retaining values for an aggregation dimension based at least part on aggregating over events associated with monitoring the application network using the plurality of agents.

3. The system recited in claim 1, wherein the report comprises at least one of the following: a visualization of the application network, an event monitoring report, or a network topology report.

4. The system recited in claim 1, wherein performing adaptive event aggregation comprises performing inline learning and collection of event data.

5. The system recited in claim 1, wherein the at least one processor is further configured to:
  generate a graphical visualization of the application network based on the report indicating critical and failure events based on a success threshold.

6. The system recited in claim 1, wherein the at least one processor further configured to:
  generate a graphical visualization of a topology of the application network.

7. The system of claim 1, wherein to sample a data collection into a learning buffer, the at least one processor is configured to:
  copy event records comprising keys and metrics into the learning buffer until the learning buffer reaches a size limit, wherein the event records detail API call events in the application network, and wherein the metrics are aggregated in the learning buffer based on the aggregation dimension.

8. The system of claim 1, wherein the retaining values specify a number of values to keep in the learning buffer for the aggregation dimension.

9. The system of claim 1, wherein to store additional events into an overflow buffer using inline aggregation, the at least one processor is configured to:
  receive an additional event record after the learning buffer reaches the size limit; and
  copy the additional event record into the overflow buffer when the additional event record does not match the aggregation dimensions in the learning buffer, wherein a value in the additional event record is replaced with a special token when the value is not found in the retaining values.

10. The system of claim 1, where to the at least one processor further configured to:
  generate a graphical visualization of the application network based on the aggregate result, wherein the graphical visualization further indicates a number of API calls between applications in the application network.

11. A method comprising:
  monitoring an application network using a plurality of agents;
  sampling a data collection into a learning buffer;
  performing adaptive event aggregation to determine retaining values for an aggregation dimension using learning in an event that the learning buffer is full;
  storing additional events into an overflow buffer using inline aggregation;
  extracting an aggregate result from the learning buffer and the overflow buffer; and
  generating a report of the application network based on the aggregation dimension.

12. The method of claim 11, the sampling further comprising:
  copying event records comprising keys and metrics into the learning buffer until the learning buffer reaches a size limit, wherein the event records detail API call events in the application network, and wherein the metrics are aggregated in the learning buffer based on the aggregation dimension.

13. The method of claim 11, wherein the retaining values specify a number of values to keep in the learning buffer for the aggregation dimension.

14. The method of claim 11, the storing further comprising:
  receiving an additional event record after the learning buffer reaches the size limit; and
  copying the additional event record into the overflow buffer when the additional event record does not match the aggregation dimensions in the learning buffer, wherein a value in the additional event record is replaced with a special token when the value is not found in the retaining values.

15. The method of claim 11, further comprising:
  generating a graphical visualization of the application network based on the aggregate result, wherein the graphical visualization further indicates a number of API calls between applications in the application network.

16. A non-transitory computer-readable device having instructions stored thereon that, when executed by at least one computing device, causes the at least one computing device to perform operations comprising:

monitoring an application network using a plurality of agents;

sampling a data collection into a learning buffer;

performing adaptive event aggregation to determine retaining values for an aggregation dimension using learning in an event that the learning buffer is full;

storing additional events into an overflow buffer using inline aggregation;

extracting an aggregate result from the learning buffer and the overflow buffer; and generating a report of the application network based on the aggregation dimension.

17. The non-transitory computer-readable device of claim 16, the sampling comprising:

copying event records comprising keys and metrics into the learning buffer until the learning buffer reaches a size limit, wherein the event records detail API call events in the application network, and wherein the metrics are aggregated in the learning buffer based on the aggregation dimension.

18. The non-transitory computer-readable device of claim 16, wherein the retaining values specify a number of values to keep in the learning buffer for the aggregation dimension.

19. The non-transitory computer-readable device of claim 16, the storing comprising:

receiving an additional event record after the learning buffer reaches the size limit; and copying the additional event record into the overflow buffer when the additional event record does not match the aggregation dimensions in the learning buffer, wherein a value in the additional event record is replaced with a special token when the value is not found in the retaining values.

20. The non-transitory computer-readable device of claim 16, the operations further comprising:

generating a graphical visualization of the application network based on the aggregate result, wherein the graphical visualization further indicates a number of API calls between applications in the application network.

* * * * *